United States Patent Office 2,971,919
Patented Feb. 14, 1961

2,971,919

PAINT STRIPPER COMPOSITION

Henry A. Goldsmith, Detroit, Mich., assignor to Solventol Chemical Products, Incorporated, a corporation of Michigan No Drawing. Filed Feb. 27, 1958, Ser. No. 717,830

18 Claims. (Cl. 252—139)

This invention relates to a composition for use in stripping a wide variety of paints and similar coatings from the surfaces of articles made of metal or other materials such as glass, rubber or phenolic resins, and constitutes an improvement on the composition disclosed in the copending joint application of applicant and Benjamin Ray, Serial No. 632,651, filed January 7, 1957.

Caustic soda and caustic potash solutions, with or without additions of auxiliary ingredients have been used as paint strippers for many years, but are not particularly effective for use in stripping some of the resin-base paints and enamels which are being used in increasing quantities. Fair results with some resin-base paints have been attained with combinations of caustic alkali with cresylic acid; but if this combination of ingredients contains sufficient cresylic acid to give the fair results it cannot be made up in the form of a dry, free-flowing powder, which is highly desirable to facilitate packaging, shipping and handling in view of the hazardous and corrosive nature of strong caustic solutions.

The above mentioned application discloses a paint stripping composition containing as essential ingredients an alkali compound and a chlorinated phenol compound. That composition can be made up as a dry, free-flowing powder for ease and safety in shipment and handling. When dissolved in water, it is superior to prior strippers in its ability to remove many of the resin-base paints and is equal to prior strippers when used on other paints, lacquers and enamels.

It is the object of the present invention to increase the effectiveness of the type of alkali-chlorinated phenol paint stripper disclosed in said copending application and to extend its usefulness to a wider range of paints, enamels and other coatings.

It is a further object of the invention to provide a preferred range of the improved compositions which have all of the advantages of the prior alkali-chlorinated phenol composition from the standpoint of ease and safety of packaging, shipping and handling, which are no more expensive than the prior composition and which have a number of decided advantages over the prior composition.

In accordance with the present invention, the foregoing and other objects are achieved by combining with the alkali and the chlorinated phenol compounds a third ingredient, namely, a glycol ether of a type more fully defined hereinafter. This paint stripping composition is intended for use in aqueous solutions.

The function of the glycol ethers employed in the composition is not fully understood, particularly since they have little if any paint stripping capacity of their own in water solutions and do not seem to be particularly beneficial in alkali solution paint strippers which contain no chlorinated phenol of the type employed in the composition of the present invention. Moreover, they are not fully soluble in the highly alkaline solutions which result when the composition is dissolved in water. However, they do seem to enhance the solubility of the chlorinated phenol compound and perhaps for that reason make the chlorinated phenol more effective. This is particularly advantageous when the higher solution concentrations are used, i.e., above 1 pound per gallon, since the chlorinated phenol is not fully dissolved in the absence of the glycol ether. There is evidently another factor involved, because the glycol ether improves performance even in the case of the weaker solutions in which the alkali and chlorinated phenol are completely soluble. Thus, in all concentrations it is found that the superior results are achieved with smaller quantities of chlorinated phenol if the glycol ether is present.

The chlorinated phenols which have been found to be suitable for the paint stripping combination of the present invention are certain phenol compounds which are ring-substituted with at least one and preferably with three chlorine atoms and which chlorinated phenols are soluble in aqueous alkali solutions. The phenol compounds are those having the formula:

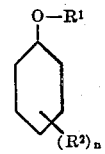

wherein $R^1$ is a radical selected from the group consisting of hydrogen, sodium and potassium; wherein $R^2$ is a radical selected from the group consisting of alkyl, phenyl, alkyl-phenyl, hydroxy phenyl, phenyl-alkyl, and hydroxy phenyl-alkyl and in which the alkyl radical contains 1 to 5 carbon atoms inclusive; and wherein $n$ represents a number from 0 to 3 inclusive. The chlorine atom or atoms may be on the main ring or a subsidiary ring or both.

Specific examples of chlorinated phenols within the above definition suitable for the purposes of the present invention are: trichlorophenol, tetrachlorophenol, pentachlorophenol, chloroxylenol, chlorocresol, chlorobenzyl phenol, chlorophenyl phenol, and methylene bis-(trichlorophenol), and sodium and potassium salts thereof. Commercial mixtures of one or more chlorinated phenols within the above definition, such as Dowicide 7, a trade name, may be employed in the practice of the invention. Within the above definition, the preferred chlorinated phenols from the standpoint of paint stripping action are those selected from the group consisting of trichlorophenol, tetrachlorophenol, pentachlorophenol, chlorophenyl phenol, and sodium and potassium salts thereof and which group includes commercial mixtures containing the recited chlorinated phenol as the major constituent thereof. It will be appreciated that when one or more of the specified chlorinated phenol compounds is combined with the alkali compound to be hereinafter defined, the two may react to form the corresponding sodium or potassium salt which may thus be present even though not added as such.

The alkali compounds which must be present are those selected from the group consisting of caustic and a water soluble alkali metal silicate depending upon the metal surface to be treated. The term "caustic" as used herein means sodium or potassium hydroxide. For stripping paint from metal surfaces such as iron and steel which are relatively immune to caustic attack, the alkali compound may be simply caustic. As much as half of the required amount of caustic may be successfully replaced by soda ash, which is a diluent. For stripping paint from alkali sensitive metals such as zinc, tin, brass or aluminum, the caustic may be replaced in whole or in part by water soluble alkali metal silicates. Examples of a suitable water soluble alkali metal silicate are sodium metasilicate and sodium disilicate. Sodium metasilicate, which will attack aluminum if used in concentrated solutions (8 or more ounces per gallon), may be combined with sodium bicarbonate in amounts up to 50% of the dry mixture. The bicarbonate acts as a buffer and permits use of the higher solution concentrations on aluminum.

The glycol ethers which are incorporated in the composition comprise one or more of those having the formula:

$$R^3O(CH_2CH\ R^4O)_xR^5$$

in which $R^3$ represents the phenyl or the cyclohexyl radical or an alkyl radical having the formula, $C_yH_{(2y+1)}$; $y$ represents a number from 2 to 8 inclusive (and preferably 4 to 8 inclusive); $R^4$ represents H or $CH_3$; $R^5$ represents H or $R^3$; and $x$ represents the number 1 or 2. These compounds, which for the sake of brevity are referred to herein as glycol ethers, include, among others, the following specific compounds:

Monophenyl ether of ethylene glycol
Diphenyl ether of ethylene glycol
Monobutyl ether of ethylene glycol
Methylpentyl ether of ethylene glycol
n-Hexyl ether of ethylene glycol
Monophenyl ether of diethylene glycol
Diphenyl ether of diethylene glycol
n-Hexyl ether of diethylene glycol
Monobutyl ether of diethylene glycol
Monophenyl ether of propylene glycol
Diphenyl ether of propylene glycol.

There are commercial compositions available which comprise a mixture of two of the foregoing glycol ether compounds and which may be used in the compositions of the present invention. Among these are: Dowanol #1, which is a mixture of mono- and diphenyl ethers of ethylene glycol; and Dowanol #2B, which is a mixture of mono- and diphenyl ethers of propylene glycol, both of which are sold by The Dow Chemical Company of Midland, Michigan.

One or more of the specified chlorinated phenols and alkali compounds to make up the dry solid constituents of the composition of the invention must be admixed in the proportion of 4 parts by weight of one or more of the specified chlorinated phenols to from 8 to 400 parts by weigh of one or more alkali compounds selected from the group consisting of caustic and a water soluble alkali metal silicate. While the advantages of the invention may be realized to some extent throughout the entire range of proportions of alkali to chlorinated phenol given above, the preferred range of proportions is from 10 to 200 parts of alkali to 4 parts of chlorinated phenol. It should be noted that these proportions are not on an anhydrous basis but rather include the water of crystallization which some of the ingredients normally contain. The caustic compound is preferably caustic alkali alone for stripping paint from surfaces of iron, steel, copper and nickel and alloys thereof and from other similar metal surfaces which are relatively insensitive to caustic attack. For stripping paint from surfaces of aluminum and aluminum-base alloys, the caustic is preferably replaced by one or more of the water soluble alkali metal silicates. For zinc, tin and lead and alloys thereof both caustic and the alkali metal silicates are preferably present, with the latter in major amounts.

The glycol ether is added to and thoroughly mixed with the foregoing dry ingredients. Since the glycol ether is a liquid and the preferred compositions of the present invention are free-flowing, seemingly dry powders, the quantity of glycol ether is preferably kept below the level which would impair the free-flowing character of the powder. This prefered upper limit will depend upon the nature of the dry ingredients employed, but will range between 8% and 12% of the total nonaqueous mixture by weight. If the major constituent of the composition is NaOH, the glycol ether may be present up to almost 12% without causing difficulty, while about 8% is the upper limit if the principal constituent is KOH. Since excellent results are obtained when the glycol ether is in the range of 3% to 7% of the composition by weight, this limitation on the maximum quantity of glycol ether in the preferred composition is not objectionable.

While it is preferred to keep the quantity of glycol ether below that which would interfere with the free-flowing of the powder, it has been found in some rare cases that larger quantities of the glycol ether are necessary to do an effective stripping job. In that case it is the prefered practice to add the additional quantity of glycol ether after the remainder of the composition is dissolved in the water for actual use.

Excellent results have been obtained with compositions in which the glycol ether ranged from about 1 to 10 parts by weight for each 4 parts of chlorinated phenol. However, if the composition is to be free-flowing, the larger quantities of glycol ether within the above range should be employed only when the quantity of alkali present is sufficient to prevent caking.

It is a common practice to incorporate in alkali paint stripping compositions various additives such as wetting agents, dispersing agents and sequestering agents. While these are not necessary to the paint stripping compositions of the present invention they may have their usual advantageous effects and consequently may be present, if desired, without departing from the invention. Thus, wetting agents, such as soaps, sulfonated detergents, tall oil or rosin soaps, and dispersing agents such as lignin sulfonate, and sequestering agents such as sodium gluconate may be present in amounts up to 10%. Similarly, soda ash may be added as a diluent.

For use, the seemingly dry, powdered (powder, granules, flakes, etc.) composition is combined with water to produce a solution or slurry having a concentration of from 5% to 45% by weight of the dry composition to that of the total aqueous mixture. The preferred concentration is from 5% to 25% of the dry composition with the proportions of the ingredients in the dry composition being such that the solution has at least 1½% uncombined alkali. In the case of ferrous metal surfaces and other metal surfaces which are relatively resistant to caustic attack, the aqueous solution may be maintained at or near its boiling point when the article to be stripped is immersed therein. In the case of aluminum and other caustic-sensitive metals, the bath is preferably maintained below its boiling point, usually in the range of about 180° F.

In cases where immersion of the article to be stripped is impractical and in other cases, the aqueous mixture may be applied by spraying or other suitable ways. For example, the type of steam spraying equipment used to clean automobile engines or white sidewall tires may be used to apply a spray which is a mixture of the paint stripping solution and steam. After the stripping operation the metal surface may be rinsed as desired. The aqueous mixture in the form of a solution or slurry may also be used for refinishing painted articles by first removing the paint from the surface thereof as above described and thereafter neutralizing the alkaline ingredients which may adhere to the stripped surface with a suitable acid such as phosphoric acid before repainting.

A wide variety of compositions may be made up in accordance with the foregoing and it has been found that some are better for removing one type of coating and others for another. However, a composition which has given good results on a very wide range of coatings has the following composition (all proportions in the following examples are in parts by weight):

EXAMPLE A

41 NaOH
4 pentachlorophenol sodium salt
2 mono- and diphenyl ethers of ethylene glycol (Dowanol #1)

½ wetting agent (short chain alkyl naphthalene sulfonate)
2 dispersing agent (sodium lignin sulfonate)
½ sequestering agent (sodium gluconate).

The last three ingredients are optional. This composition, when used in a concentration of 1 pound per gallon in boiling water, stripped the following types of paint or enamel coatings in the time indicated without adverse effect upon the underlying base:

|  | Minutes |
|---|---|
| Styrenated alkyd on steel | 1 |
| Vinyl on steel | 2 |
| Kodak photo-resist on steel | 2 |
| Urea-alkyd wrinkle on steel | 2½ |
| Bonderized melamine-alkyd (baked 20 min. at 300° F.) | 3–4 |
| Zinc chromate-iron oxide-alkyd primer on steel | 5–6 |
| Melamine modified alkyd on steel | 5 |
| White epoxy enamel on steel | 5 |
| Alkyd resin on phenolic resin housing | 5 |

The same composition (Example A) at a concentration of ½ pound per gallon stripped a melamine-alkyd resin from a hard rubber base in 8 minutes; and at a concentration of 2 pounds per gallon stripped a grey epoxy refrigerator enamel and primer in 7 minutes.

In addition to paints and enamels the composition is effective for the removal of other coatings which are difficult to remove. For example, it is an outstanding material for removing the mold lubricating compounds which are baked on glass molds and rubber molds, and it may be used in a steam spray for cleaning engines and similar machinery. However, it is not a satisfactory stripper for phenolic and bituminous paints.

Other compositions within the scope of the present invention include the following:

EXAMPLE B
66.4 NaOH
4 pentachlorophenol sodium salt
4 mono- and diphenyl ethers of ethylene glycol (Dowanol #1)
½ wetting agent (short chain alkyl naphthalene sulfonate)
2 dispersing agent (sodium lignin sulfonate)
½ sequestering agent (sodium gluconate)

EXAMPLE C
144 NaOH
4 pentachlorophenol sodium salt
8 mono- and diphenyl ethers of ethylene glycol (Dowanol #1)
4 wetting agent (short chain alkyl naphthalene sulfonate)

EXAMPLE D
34 NaOH
4 pentachlorophenol sodium salt
2 mono- and diphenyl ethers of ethylene glycol (Dowanol #1)

EXAMPLE E
26.5 NaOH
4 pentachlorophenol sodium salt
1.6 mono- and diphenyl ethers of ethylene glycol (Dowanol #1)

EXAMPLE F
26.5 NaOH
4 tetrachlorophenol sodium salt
1.6 mono- and diphenyl ethers of ethylene glycol (Dowanol #1)

EXAMPLE G
26.5 NaOH
4 trichlorophenol sodium salt
1.6 mono- and diphenyl ethers of ethylene glycol (Dowanol #1)

EXAMPLE H
26.5 NaOH
4 2-chloro, 4-phenyl phenol sodium salt
1.6 mono- and diphenyl ethers of ethylene glycol (Dowanol #1)

EXAMPLE I
26.5 NaOH
4 tetrachlorophenol sodium salt
1.6 mono- and diphenyl ethers of propylene glycol (Dowanol #2B)

EXAMPLE J
26.5 NaOH
4 tetrachlorophenol sodium salt
1.6 phenoxyethanol

EXAMPLE K
26.5 NaOH
4 tetrachlorophenol sodium salt
1.6 hexyl ether of ethylene glycol

EXAMPLE L
11 NaOH
4 pentachlorophenol sodium salt
1.6 mono- and diphenyl ethers of ethylene glycol (Dowanol #1)

EXAMPLE M
144 KOH
4 pentachlorophenol sodium salt
8 mono- and diphenyl ethers of ethylene glycol (Dowanol #1)
4 wetting agent (short chain alkyl napthalene sulfonate)

EXAMPLE N
38 KOH
4 pentachlorophenol sodium salt
3 mono- and diphenyl ethers of ethylene glycol (Dowanol #1)

EXAMPLE O
21 KOH
4 pentachlorophenol sodium salt
2 mono- and diphenyl ethers of ethylene glycol (Dowanol #1)

EXAMPLE P
26 KOH
4 pentachlorophenol sodium salt
1 mono- and diphenyl ethers of ethylene glycol (Dowanol #1)

EXAMPLE Q
14 KOH
4 pentachlorophenol sodium salt
1 mono- and diphenyl ethers of ethylene glycol (Dowanol #1)

EXAMPLE R
14 sodium metasilicate anhydrous
11½ sodium bicarbonate
4 pentachlorophenol sodium salt
2.4 monobutyl ether of ethylene glycol

EXAMPLE S
22 sodium metasilicate anhydrous
18 sodium bicarbonate
4 pentachlorophenol sodium salt
4 mono- and diphenyl ethers of ethylene glycol (Dowanol #1)
1 sodium lignin sulfonate Examples R and S are useful for stripping paints from aluminum. They may be modified by substituting sodium disilicate for all or any part of the sodium metasilicate in which event a corresponding part of the sodium bicarbonate may be omitted. All of the foregoing compositions are seemingly dry, free-flowing powders.

As a general rule, KOH and NaOH are interchangeable in all of the above examples. Since KOH is more soluble, it may be used to advantage where higher concentrations are desired.

In addition to the three essential compounds and the wetting agents, dispersing agents and sequestering agents which may be present in the compositions of the present invention, if desired, it is possible to include weaker alkalies which will act primarily as diluents. These low-cost materials, such as soda ash, can be added up to 50% of the combined dry ingredients, but will have no appreciable effect upon the performance of the other ingredients. Accordingly, the three essential types of ingredients must be present in quantities of at least 50% of the total non-aqueous constituents.

The following table shows the advantage realized from the composition of the present invention as compared with similar caustic solutions containing a chlorinated phenol but no glycol ether and containing a glycol ether but no chlorinated phenol. The compositions used for comparison purposes are identified as Compositions X, Y and Z, which contained the following:

*Composition X*

19 KOH
4 mono- and diphenyl ethers of ethylene glycol (Dowanol #1)

*Composition Y*

12 KOH
4 pentachlorophenyl sodium salt

*Composition Z*

12 NaOH
4 pentachlorophenyl sodium salt.

Each of the above compositions, together with the compositions of Examples A, C, Q, P and M, was dissolved in boiling water at a concentration of 1 pound per gallon, and samples of steel sheets bearing an epoxy refrigerator enamel were immersed in the boiling solution. The time required to strip the enamel in each case is noted below.

| Example: | Time to strip |
|---|---|
| X | Did not strip |
| Y | More than 30 min. |
| Z | More than 30 min. |
| A | 5 min. |
| C | 4 min. |
| M | 4 min. |
| P | 3 min. |
| Q | 7 min. |

It will be noted from the above that Example Q, which corresponds most closely in proportions to Compositions X, Y and Z, was vastly superior to them and that other examples of applicant's invention are even better.

What is claimed is:

1. A paint stripping composition adapted for use in water, said composition consisting essentially of at least one phenol compound ring-substituted with at least one chlorine, at least one alkali compound, and at least one glycol ether compound, said chlorinated phenol being soluble in aqueous alkali solutions and the phenol compound having the formula:

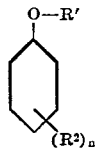

in which $R^1$ is a radical selected from the group consisting of hydrogen, sodium and potassium, $R^2$ is a radical selected from the group consisting of alkyl, phenyl, alkyl-phenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being selected from the group consisting of caustic alkali and alkali metal silicate, and said glycol ether being of the formula:

$$R^3O(CH_2CHR^4O)_xR^5$$

in which $R^3$ represents a radical selected from the group consisting of phenyl, cyclohexyl and an alkyl radical having the formula $$C_yH_{(2y+1)}$$

in which $y$ represents a number from 2 to 8 inclusive, $R^4$ represents a radical selected from the group consisting of H and $CH_3$, $R^5$ represents a radical selected from the group consisting of H and $R^3$ and $x$ is a number selected from the group consisting of 1 and 2, said compounds being present in the proportion of 4 parts by weight of said chlorinated phenol to from 8 to 400 parts by weight of said alkali compound and from 1 to 10 parts by weight of the glycol ether.

2. A paint stripping composition adapted for use in water, said composition consisting essentially of at least one phenol compound ring-substituted with at least one chlorine, at least one alkali compound, and at least one glycol ether compound, said chlorinated phenol being soluble in aqueous alkali solutions and the phenol compound having the formula:

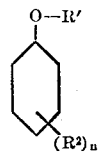

in which $R^1$ is a radical selected from the group consisting of hydrogen, sodium and potassium, $R^2$ is a radical selected from the group consisting of alkyl, phenyl, alkyl-phenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being sodium hydroxide, and said glycol ether being of the formula:

$$R^3O(CH_2CHR^4O)_xR^5$$

in which $R^3$ represents a radical selected from the group consisting of phenyl, cyclohexyl and an alkyl radical having the formula $$C_yH_{(2y+1)}$$

in which $y$ represents a number from 2 to 8 inclusive, $R^4$ represents a radical selected from the group consisting of H and $CH_3$, $R^5$ represents a radical selected from the group consisting of H and $R^3$ and $x$ is a number selected from the group consisting of 1 and 2, said compounds being present in the proportion of 4 parts by weight of said chlorinated phenol to from 8 to 400 parts by weight of said alkali compound and from 1 to 10 parts by weight of the glycol ether.

3. A paint stripping composition adapted for use in water, said composition consisting essentially of at least one phenol compound ring-substituted with at least one chlorine, at least one alkali compound, and at least one glycol ether compound, said chlorinated phenol being soluble in aqueous alkali solutions and the phenol compound having the formula:

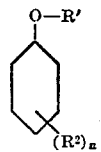

in which $R^1$ is a radical selected from the group consisting of hydrogen, sodium and potassium, $R^2$ is a radical selected from the group consisting of alkyl, phenyl, alkyl-phenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being potassium hydroxide, and said glycol ether being of the formula:

$$R^3O(CH_2CHR^4O)_xR^5$$

in which $R^3$ represents a radical selected from the group consisting of phenyl, cyclohexyl and an alkyl radical having the formula $$C_yH_{(2y+1)}$$

in which $y$ represents a number from 2 to 8 inclusive, $R^4$ represents a radical selected from the group consisting of H and $CH_3$, $R^5$ represents a radical selected from the group consisting of H and $R^3$ and $x$ is a number selected from the group consisting of 1 and 2, said compounds being present in the proportion of 4 parts by weight of said chlorinated phenol to from 8 to 400 parts by weight of said alkali compound and from 1 to 10 parts by weight of the glycol ether.

4. A paint stripping composition adapted for use in water, said composition consisting essentially of at least one phenol compound ring-substituted with at least one chlorine, at least one alkali compound, and at least one glycol ether compound, said chlorinated phenol being soluble in aqueous alkali solutions and the phenol compound having the formula:

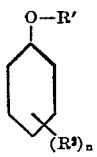

in which $R^1$ is a radical selected from the group consisting of hydrogen, sodium and potassium, $R^2$ is a radical selected from the group consisting of alkyl, phenyl, alkyl-phenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being a water soluble alkali metal silicate, and said glycol ether being of the formula:

$$R^3O(CH_2CHR^4O)_xR^5$$

in which $R^3$ represents a radical selected from the group consisting of phenyl, cyclohexyl and an alkyl radical having the formula $$C_yH_{(2y+1)}$$

in which $y$ represents a number from 2 to 8 inclusive, $R^4$ represents a radical selected from the group consisting of H and $CH_3$, $R^5$ represents a radical selected from the group consisting of H and $R^3$ and $x$ is a number selected from the group consisting of 1 and 2, said compounds being present in the proportion of 4 parts by weight of said chlorinated phenol to from 8 to 400 parts by weight of said alkali compound and from 1 to 10 parts by weight of the glycol ether.

5. A paint stripping composition adapted for use in water, at least 50% of said composition consisting essentially of at least one phenol compound ring-substituted with at least 3 chlorine atoms, at least one alkali compound, and at least one glycol ether compound, said chlorinated phenol being soluble in aqueous alkali solutions and the phenol compound having the formula:

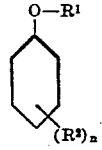

in which $R^1$ is a radical selected from the group consisting of hydrogen, sodium and potassium, $R^2$ is a radical selected from the group consisting of an alkyl, phenyl, alkyl-phenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being selected from the group consisting of caustic alkali and alkali metal silicate, and said glycol ether being of the formula:

$$R^3O(CH_2CHR^4O)_xR^5$$

in which $R^3$ represents a radical selected from the group consisting of phenyl, cyclohexyl and an alkyl radical having the formula:

$$C_yH_{(2y+1)}$$

in which $y$ represents a number from 4 to 8 inclusive, $R^4$ represents a radical selected from the group consisting of H and $CH_3$, $R^5$ represents a radical selected from the group consisting of H and $R^3$, and $x$ is a number selected from the group consisting of 1 and 2, said chlorinated phenol and said alkali compound being present in the proportion of 4 parts by weight of said chlorinated phenol to from 10 to 200 parts by weight of said alkali compound and from 1 to 10 parts by weight of the glycol ether.

6. A paint stripping composition adapted for use in water, at least 50% of said composition consisting essentially of at least one phenol compound ring-substituted with at least 3 chlorine atoms, at least one alkali compound, and at least one glycol ether compound, said chlorinated phenol being soluble in aqueous alkali solutions and the phenol compound having the formula:

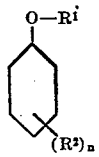

in which $R^1$ is a radical selected from the group consisting of hydrogen, sodium and potassium, $R^2$ is a radical selected from the group consisting of an alkyl, phenyl, alkyl-phenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being sodium hydroxide, and said glycol ether being of the formula:

$$R^3O(CH_2CHR^4O)_xR^5$$

in which $R^3$ represents a radical selected from the group consisting of phenyl, cyclohexyl and an alkyl radical having the formula:

$$C_yH_{(2y+1)}$$

in which $y$ represents a number from 4 to 8 inclusive, $R^4$ represents a radical selected from the group consisting of H and $CH_3$, $R^5$ represents a radical selected from the group consisting of H and $R^3$, and $x$ is a number selected from the group consisting of 1 and 2, said chlorinated phenol and said alkali compound being present in the proportion of 4 parts by weight of said chlorinated phenol to from 10 to 200 parts by weight of said alkali compound and from 1 to 10 parts by weight of the glycol ether.

7. A paint stripping composition adapted for use in water, at least 50% of said composition consisting essentially of at least one phenol compound ring-substituted with at least 3 chlorine atoms, at least one alkali compound, and at least one glycol ether compound, said chlorinated phenol being soluble in aqueous alkali solutions and the phenol compound having the formula:

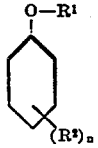

in which $R^1$ is a radical selected from the group consisting of hydrogen, sodium and potassium, $R^2$ is a radical selected from the group consisting of an alkyl, phenyl, alkyl-phenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being potassium hydroxide, and said glycol ether being of the formula:

$$R^3O(CH_2CHR^4O)_xR^5$$

in which $R^3$ represents a radical selected from the group consisting of phenyl, cyclohexyl and an alkyl radical having the formula:

$$C_yH_{(2y+1)}$$

in which $y$ represents a number from 4 to 8 inclusive, $R^4$ represents a radical selected from the group consisting of H and $CH_3$, $R^5$ represents a radical selected from the group consisting of H and $R^3$, and $x$ is a number selected from the group consisting of 1 and 2, said chlorinated phenol and said alkali compound being present in the proportion of 4 parts by weight of said chlorinated phenol to from 10 to 200 parts by weight of said alkali compound and from 1 to 10 parts by weight of the glycol ether.

8. A paint stripping composition adapted for use in water, at least 50% of said composition consisting essentially of at least one phenol compound ring-substituted with at least 3 chlorine atoms, at least one alkali compound, and at least one glycol ether compound, said chlorinated phenol being soluble in aqueous alkali solutions and the phenol compound having the formula:

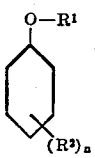

in which $R^1$ is a radical selected from the group consisting of hydrogen, sodium and potassium, $R^2$ is a radical selected from the group consisting of an alkyl, phenyl, alkyl-phenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being a water soluble alkali metal silicate, and said glycol ether being of the formula:

$$R^3O(CH_2CHR^4O)_xR^5$$

in which $R^3$ represents a radical selected from the group consisting of phenyl, cyclohexyl and an alkyl radical having the formula:

$$C_yH_{(2y+1)}$$

in which $y$ represents a number from 4 to 8 inclusive, $R^4$ represents a radical selected from the group consisting of H and $CH_3$, $R^5$ represents a radical selected from the group consisting of H and $R^3$, and $x$ is a number selected from the group consisting of 1 and 2, said chlorinated phenol and said alkali compound being present in the proportion of 4 parts by weight of said chlorinated phenol to from 10 to 200 parts by weight of said alkali compound and from 1 to 10 parts by weight of the glycol ether.

9. A paint stripping composition comprising an aqueous mixture consisting essentially of water, at least one phenol compound ring-substituted with at least one chlorine, at least one alkali compound, and at least one glycol ether compound, said chlorinated phenol being soluble in aqueous alkali solutions and the phenol compound having the formula:

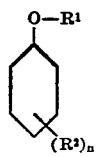

in which $R^1$ is a radical selected from the group consisting of hydrogen, sodium and potassium, $R^2$ is a radical selected from the group consisting of alkyl, phenyl, alkyl-phenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being selected from the group consisting of caustic alkali and alkali metal silicate, and said glycol ether being of the formula:

$$R^3O(CH_2CHR^4O)_xR^5$$

in which $R^3$ represents a radical selected from the group consisting of phenyl, cyclohexyl and an alkyl radical having the formula:

$$C_yH_{(2y+1)}$$

in which $y$ represents a number from 2 to 8 inclusive, $R^4$ represents a radical selected from the group consisting of H and $CH_3$, $R^5$ represents a radical selected from the group consisting of H and $R^3$, and $x$ is a number selected from the group consisting of 1 and 2, said chlorinated phenol and said alkali compound being present in the proportion of 4 parts by weight of said chlorinated phenol to from 8 to 400 parts by weight of said alkali compound and from 1 to 10 parts by weight of the glycol ether, said chlorinated phenol and said alkali compound and said glycol ether together constituting from 3% to 45% of the mixture, and the proportions of the alkali and phenol compounds being such that the solution contains at least 1½% uncombined alkalies.

10. A paint stripping composition comprising an aqueous mixture consisting essentially of water, at least one phenol compound ring-substituted with at least one chlorine, at least one alkali compound, and at least one glycol ether compound, said chlorinated phenol being soluble in aqueous alkali solutions and the phenol compound having the formula:

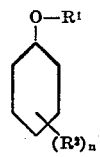

in which $R^1$ is a radical selected from the group consisting of hydrogen, sodium and potassium, $R^2$ is a radical selected from the group consisting of alkyl, phenyl, alkyl-phenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being sodium hydroxide, and said glycol ether being of the formula:

$$R^3O(CH_2CHR^4O)_xR^5$$

in which $R^3$ represents a radical selected from the group consisting of phenyl, cyclohexyl and an alkyl radical having the formula:

$$C_yH_{(2y+1)}$$

in which $y$ represents a number from 2 to 8 inclusive, $R^4$ represents a radical selected from the group consisting of H and $CH_3$, $R^5$ represents a radical selected from the group consisting of H and $R^3$, and $x$ is a number selected from the group consisting of 1 and 2, said chlorinated phenol and said alkali compound being present in the proportion of 4 parts by weight of said chlorinated phenol to from 8 to 400 parts by weight of said alkali compound and from 1 to 10 parts by weight of the glycol ether, said chlorinated phenol and said alkali compound and said glycol ether together constituting from 3% to 45% of the mixture, and the proportions of the alkali and phenol compounds being such that the solution contains at least 1½% uncombined alkalies.

11. A paint stripping composition comprising an aqueous mixture consisting essentially of water, at least one phenol compound ring-substituted with at least one chlorine, at least one alkali compound, and at least one glycol ether compound, said chlorinated phenol being soluble in aqueous alkali solutions and the phenol compound having the formula:

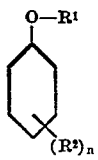

in which $R^1$ is a radical selected from the group consisting of hydrogen, sodium and potassium, $R^2$ is a radical selected from the group consisting of alkyl, phenyl, alkyl-phenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being potassium hydroxide, and said glycol ether being of the formula:

in which $R^3$ represents a radical selected from the group consisting of phenyl, cyclohexyl and an alkyl radical having the formula:

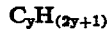

in which $y$ represents a number from 2 to 8 inclusive, $R^4$ represents a radical selected from the group consisting of H and $CH_3$, $R^5$ represents a radical selected from the group consisting of H and $R^3$, and $x$ is a number selected from the group consisting of 1 and 2, said chlorinated phenol and said alkali compound being present in the proportion of 4 parts by weight of said chlorinated phenol to from 8 to 400 parts by weight of said alkali compound and from 1 to 10 parts by weight of the glycol ether, said chlorinated phenol and said alkali compound and said glycol ether together constituting from 3% to 45% of the mixture, and the proportions of the alkali and phenol compounds being such that the solution contains at least 1½% uncombined alkalies.

12. A paint stripping composition comprising an aqueous mixture consisting essentially of water, at least one phenol compound ring-substituted with at least one chlorine, at least one alkali compound, and at least one glycol ether compound, said chlorinated phenol being soluble in aqueous alkali solutions and the phenol compound having the formula:

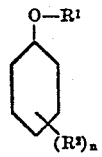

in which $R^1$ is a radical selected from the group consisting of hydrogen, sodium and potassium, $R^2$ is a radical selected from the group consisting of alkyl, phenyl, alkyl-phenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being a water soluble alkali metal silicate, and said glycol ether being of the formula:

in which $R^3$ represents a radical selected from the group consisting of phenyl, cyclohexyl and an alkyl radical having the formula:

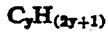

in which $y$ represents a number from 2 to 8 inclusive, $R^4$ represents a radical selected from the group consisting of H and $CH_3$, $R^5$ represents a radical selected from the group consisting of H and $R^3$, and $x$ is a number selected from the group consisting of 1 and 2, said chlorinated phenol and said alkali compound being present in the proportion of 4 parts by weight of said chlorinated phenol to from 8 to 400 parts by weight of said alkali compound and from 1 to 10 parts by weight of the glycol ether, said chlorinated phenol and said alkali compound and said glycol ether together constituting from 3% to 45% of the mixture, and the proportions of the alkali and phenol compounds being such that the solution contains at least 1½% uncombined alkalies.

13. A paint stripping composition comprising an aqueous mixture consisting essentially of water, at least one phenol compound ring-substituted with at least 3 chlorine atoms, at least one alkali compound, and at least one glycol ether compound, said chlorinated phenol being soluble in aqueous alkali solutions and the phenol compound being of the formula:

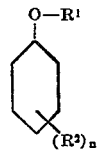

in which $R^1$ is a radical selected from the group consisting of hydrogen, sodium and potassium, $R^2$ is a radical selected from the group consisting of alkyl, phenyl, alkyl-phenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being selected from the group consisting of caustic alkali and alkali metal silicate, and said glycol ether being of the formula:

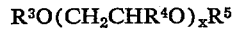

in which $R^3$ represents a radical selected from the group consisting of phenyl, cyclohexyl and an alkyl radical having the formula:

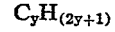

in which $y$ represents a number from 4 to 8 inclusive, $R^4$ represents a radical selected from the group consisting of H and $CH_3$, $R^5$ represents a radical selected from the group consisting of H and $R^3$ and $x$ is a number selected from the group consisting of 1 and 2, said chlorinated phenol and said alkali compound being present in the proportion of 4 parts by weight of said chlorinated phenol to from 10 to 200 parts by weight of said alkali compound and from 1 to 10 parts by weight of the glycol ether, said chlorinated phenol and said alkali compound and said glycol ether together constituting from 6% to 25% of the mixture, and the proportions of the alkali and phenol compounds being such that the solution contains at least 1½% uncombined alkalies.

14. A paint stripping composition comprising an aqueous mixture consisting essentially of water, at least one phenol compound ring-substituted with at least 3 chlorine atoms, at least one alkali compound, and at least one glycol ether compound, said chlorinated phenol being soluble in aqueous alkali solutions and the phenol compound being of the formula:

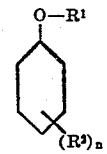

in which $R^1$ is a radical selected from the group consisting of hydrogen, sodium and potassium, $R^2$ is a radical selected from the group consisting of alkyl, phenyl, alkyl-phenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being sodium hydroxide, and said glycol ether being of the formula:

in which $R^3$ represents a radical selected from the group consisting of phenyl, cyclohexyl and an alkyl radical having the formula:

$$C_yH_{(2y+1)}$$

in which $y$ represents a number from 4 to 8 inclusive, $R^4$ represents a radical selected from the group consisting of H and $CH_3$, $R^5$ represents a radical selected from the group consisting of H and $R^3$ and $x$ is a number selected from the group consisting of 1 and 2, said chlorinated phenol and said alkali compound being present in the proportion of 4 parts by weight of said chlorinated phenol to from 10 to 200 parts by weight of said alkali compound and from 1 to 10 parts by weight of the glycol ether, said chlorinated phenol and said alkali compound and said glycol ether together constituting from 6% to 25% of the mixture, and the proportions of the alkali and phenol compounds being such that the solution contains at least 1½% uncombined alkalies.

15. A paint stripping composition comprising an aqueous mixture consisting essentially of water, at least one phenol compound ring-substituted with at least 3 chlorine atoms, at least one alkali compound, and at least one glycol ether compound, said chlorinated phenol being soluble in aqueous alkali solutions and the phenol compound being of the formula:

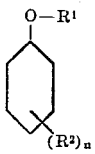

in which $R^1$ is a radical selected from the group consisting of hydrogen, sodium and potassium, $R^2$ is a radical selected from the group consisting of alkyl, phenyl, alkylphenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being potassium hydroxide, and said glycol ether being of the formula:

$$R^3O(CH_2CHR^4O)_xR^5$$

in which $R^3$ represents a radical selected from the group consisting of phenyl, cyclohexl and an alkyl radical having the formula:

$$C_yH_{(2y+1)}$$

in which $y$ represents a number from 4 to 8 inclusive, $R^4$ represents a radical selected from the group consisting of H and $CH_3$, $R^5$ represents a radical selected from the group consisting of H and $R^3$ and $x$ is a number selected from the group consisting of 1 and 2, said chlorinated phenol and said alkali compound being present in the proportion of 4 parts by weight of said chlorinated phenol to from 10 to 200 parts by weight of said alkali compound and from 1 to 10 parts by weight of the glycol ether, said chlorinated phenol and said alkali compound and said glycol ether together constituting from 6% to 25% of the mixture, and the proportions of the alkali and phenol compounds being such that the solution contains at least 1½% uncombined alkalies.

16. A paint stripping composition comprising an aqueous mixture consisting essentially of water, at least one phenol compound ring-substituted with at least 3 chlorine atoms, at least one alkali compound, and at least one glycol ether compound, said chlorinated phenol being soluble in aqueous alkali solutions and the phenol compound being of the formula:

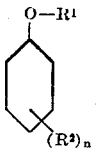

in which $R^1$ is a radical selected from the group consisting of hydrogen, sodium and potassium, $R^2$ is a radical selected from the group consisting of alkyl, phenyl, alkylphenyl, hydroxy phenyl, phenyl-alkyl, and hydroxy phenyl-alkyl and in which the alkyl radical contains 1 to 5 carbon atoms inclusive, and $n$ represents a number from 0 to 3 inclusive, said alkali compound being a water soluble alkali metal silicate, and said glycol ether being of the formula:

$$R^3O(CH_2CHR^4O)_xR^5$$

in which $R^3$ represents a radical selected from the group consisting of phenyl, cyclohexyl and an alkyl radical having the formula:

$$C_yH_{(2y+1)}$$

in which $y$ represents a number from 4 to 8 inclusive, $R^4$ represents a radical selected from the group consisting of H and $CH_3$, $R^5$ represents a radical selected from the group consisting of H and $R^3$ and $x$ is a number selected from the group consisting of 1 and 2, said chlorinated phenol and said alkali compound being present in the proportion of 4 parts by weight of said chlorinated phenol to from 10 to 200 parts by weight of said alkali compound and from 1 to 10 parts by weight of the glycol ether, said chlorinated phenol and said alkali compound and said glycol ether together constituting from 6% to 25% of the mixture, and the proportions of the alkali and phenol compounds being such that the solution contains at least 1½% uncombined alkalies.

17. A paint stripping composition adapted for use in water, said composition consisting essentially of at least one phenol compound ring-substituted with at least one chlorine, at least one alkali compound selected from the group consisting of caustic alkali and alkali metal silicate, and at least one glycol ether compound, said chlorinated phenol being selected from the group consisting of trichlorophenol, tetrachlorophenol, pentachlorophenol, chlorophenyl phenol and the alkali metal salts thereof, said glycol ether being of the formula $$R^3O(CH_2CHR^4O)_xR^5$$

in which $R^3$ represents a radical selected from the group consisting of phenyl, cyclohexyl and an alkyl radical having the formula $$C_yH_{(2y+1)}$$

in which $y$ represents a number from 2 to 8 inclusive, $R^4$ represents a radical selected from the group consisting of H and $CH_3$, $R^5$ represents a radical selected from the group consisting of H and $R^3$ and $x$ is a number selected from the group consisting of 1 and 2, said compounds being present in the proportion of 4 parts by weight of said chlorinated phenol to from 8 to 400 parts by weight of said alkali compound and from 1 to 10 parts by weight of the glycol ether.

18. A paint stripping composition comprising an aqueous mixture consisting essentially of water, at least one phenol compound ring-substituted with at least one chlorine, at least one alkali compound selected from the group consisting of caustic alkali and alkali metal silicate, and at least one glycol ether compound, said chlorinated phenol being selected from the group consisting of trichlorophenol, tetrachlorophenol, pentachlorophenol, chlorophenyl phenol and the alkali metal salts thereof, said glycol ether being of the formula:

$$R^3O(CH_2CHR^4O)_xR^5$$

in which $R^3$ represents a radical selected from the group consisting of phenyl, cyclohexyl and an alkyl radical having the formula $$C_yH_{(2y+1)}$$

in which $y$ represents a number from 2 to 8 inclusive, $R^4$ represents a radical selected from the group consisting of H and $CH_3$, $R^5$ represents a radical selected from the group consisting of H and $R_3$ and $x$ is a number selected from the group consisting of 1 and 2, said chlorinated phenol and said alkali compound being present in the proportion of 4 parts by weight of said chlorinated phenol to from 10 to 200 parts by weight of said alkali compound and from 1 to 10 parts by weight of the glycol ether.

References Cited in the file of this patent

UNITED STATES PATENTS 2,662,837    Duncan _____ Dec. 15, 1953

FOREIGN PATENTS 10,497    Great Britain _____ of 1914

OTHER REFERENCES

Vail, James G.: Soluble Silicates, Their Properties and Uses, vol. 2, pages 220 and 221, Reinhold Pub. Co., N.Y. (1952).